(12) United States Patent
Shah et al.

(10) Patent No.: US 11,489,727 B2
(45) Date of Patent: Nov. 1, 2022

(54) AUTOMATICALLY REPLICATING CONFIGURATION PARAMETERS FROM SECURELY IDENTIFIED CONNECTED SYSTEMS

(71) Applicant: EMC IP Holding Company LLC, Hopkinton, MA (US)

(72) Inventors: Maunish A. Shah, Austin, TX (US); Anurag Sharma, Cedar Park, TX (US); Gavin D. Scott, Austin, TX (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/210,004

(22) Filed: Mar. 23, 2021

(65) Prior Publication Data
US 2022/0311668 A1    Sep. 29, 2022

(51) Int. Cl.
| G06F 15/16 | (2006.01) |
| H04L 41/084 | (2022.01) |
| H04L 41/0816 | (2022.01) |
| H04L 9/08 | (2006.01) |
| H04L 41/22 | (2022.01) |
| H04L 41/08 | (2022.01) |

(52) U.S. Cl.
CPC ........ H04L 41/0846 (2013.01); H04L 9/0825 (2013.01); H04L 41/0816 (2013.01); H04L 41/0883 (2013.01); H04L 41/22 (2013.01)

(58) Field of Classification Search
CPC ... H04L 41/0846; H04L 41/22; H04L 9/0825; H04L 29/08072
USPC ................................ 709/220, 224, 228, 229
See application file for complete search history.

(56) References Cited

U.S. PATENT DOCUMENTS

| 8,706,914 | B2* | 4/2014 | Duchesneau | ............ H04L 63/20 709/250 |
| 8,706,915 | B2* | 4/2014 | Duchesneau | ......... G06F 9/5072 709/250 |
| 10,305,758 | B1* | 5/2019 | Bhide | .................. G06F 11/3466 |
| 10,791,152 | B2 | 9/2020 | Harrison | |
| 10,892,950 | B2 | 1/2021 | Sherman | |
| 2005/0138428 | A1 | 6/2005 | McAllen et al. | |
| 2009/0216910 | A1* | 8/2009 | Duchesneau | ......... G06F 9/5072 709/250 |

(Continued)

*Primary Examiner* — Khanh Q Dinh
(74) *Attorney, Agent, or Firm* — Ryan, Mason & Lewis, LLP (57) ABSTRACT

Methods, apparatus, and processor-readable storage media for automatically replicating configuration parameters from securely identified connected systems are provided herein. An example computer-implemented method includes discovering a set of one or more systems connected via at least one network; identifying at least one of the one or more systems of the discovered set by processing cryptographic data associated with at least a portion of the one or more systems; establishing a communication session with the at least one identified system by securing at least one application programming interface; replicating one or more configuration parameters from at least a portion of the at least one identified system in connection with the established communication session; and performing one or more automated actions based at least in part on the one or more replicated configuration parameters.

20 Claims, 6 Drawing Sheets

(56) References Cited

U.S. PATENT DOCUMENTS

| | | | |
|---|---|---|---|
| 2013/0306276 A1* | 11/2013 | Duchesneau | F25D 17/02 |
| | | | 709/225 |
| 2014/0317315 A1* | 10/2014 | Duchesneau | H04L 41/04 |
| | | | 709/250 |
| 2015/0207625 A1* | 7/2015 | Sathaye | H04L 9/0894 |
| | | | 726/26 |
| 2016/0248631 A1* | 8/2016 | Duchesneau | F25D 17/02 |
| 2016/0337181 A1 | 11/2016 | Cathrow et al. | |
| 2018/0041496 A1 | 2/2018 | Shivanna et al. | |
| 2019/0044823 A1* | 2/2019 | Soundararajan | H04L 41/12 |
| 2020/0104401 A1* | 4/2020 | Burnett | G06F 16/287 |
| 2020/0104402 A1* | 4/2020 | Burnett | G06F 16/24568 |
| 2020/0228779 A1* | 7/2020 | Kendrick | H04N 9/8715 |
| 2021/0117749 A1* | 4/2021 | Vetter | G06K 19/07773 |

* cited by examiner

```
HTTP/1.1 200 OK
[{
  "createdBy": "admin",
  "createdDate": "2020-10-22T20:54:33.892+0000",
  "description": "Hypervisor Mgmt",
  "destinationIpAddress": "100.68.97.xx",
  "id": "ff80808175 51db600175521782b300b4",
  "link": {
    "href":
"https://100.68.97.nnn/api/Network/mmm080817551db600175521782b30mmm",
    "rel": "self",
    "title": "vcesys-esx-mgmt"
  },
  "name": "vcesys-esx-mgmt",
  "static": true,
  "staticNetworkConfiguration": {
    "dnsSuffix": "asm.Ylabs.net",
    "gateway": "100.68.97.yyy",
    "ipRange": [
      {
        "availableIps": 16,
        "endingIp": "100.68.97.zz",
        "id": "mmm080817551db600175521782b40mmm",
        "startingIp": "100.68.97.ww",
        "totalIps": 16
      }
    ],
    "primaryDns": "100.68.68.u",
    "secondaryDns": "100.64.0.p",
    "subnet": "255.255.255.sss"
  },
  "type": "HYPERVISOR_MANAGEMENT",
  "vlanId": 50f
},
...]
```

AUTOMATICALLY REPLICATING CONFIGURATION PARAMETERS FROM SECURELY IDENTIFIED CONNECTED SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for providing security in such systems.

BACKGROUND

In many instances and contexts, systems seek and/or need to interact with other connected systems within one or more networks. For example, information technology (IT) administrators often rely on cluster managers for the deployment, configuration, and/or management of complex converged and hyperconverged solutions for data centers. However, conventional network system management techniques fail to support automated end-to-end configuration, deployment and life cycle administration of certain data center solutions (e.g., complex converged and hyperconverged data center solutions). For instance, such conventional techniques face challenges in defining network configuration parameters, typically requiring time-consuming and error-prone manual efforts to achieve multi-site consistency.

SUMMARY

Illustrative embodiments of the disclosure provide techniques for automatically replicating configuration parameters from securely identified connected systems. An exemplary computer-implemented method includes discovering a set of one or more systems connected via at least one network and identifying at least one of the one or more systems of the discovered set by processing cryptographic data associated with at least a portion of the one or more systems. The method also includes establishing a communication session with the at least one identified system by securing at least one application programming interface, replicating one or more configuration parameters from at least a portion of the at least one identified system in connection with the established communication session, and performing one or more automated actions based at least in part on the one or more replicated configuration parameters.

Illustrative embodiments can provide significant advantages relative to conventional network system management techniques. For example, problems associated with time-consuming and error-prone manual efforts for defining network configuration parameters are overcome in one or more embodiments through automatically replicating configuration parameters from securely identified connected systems.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
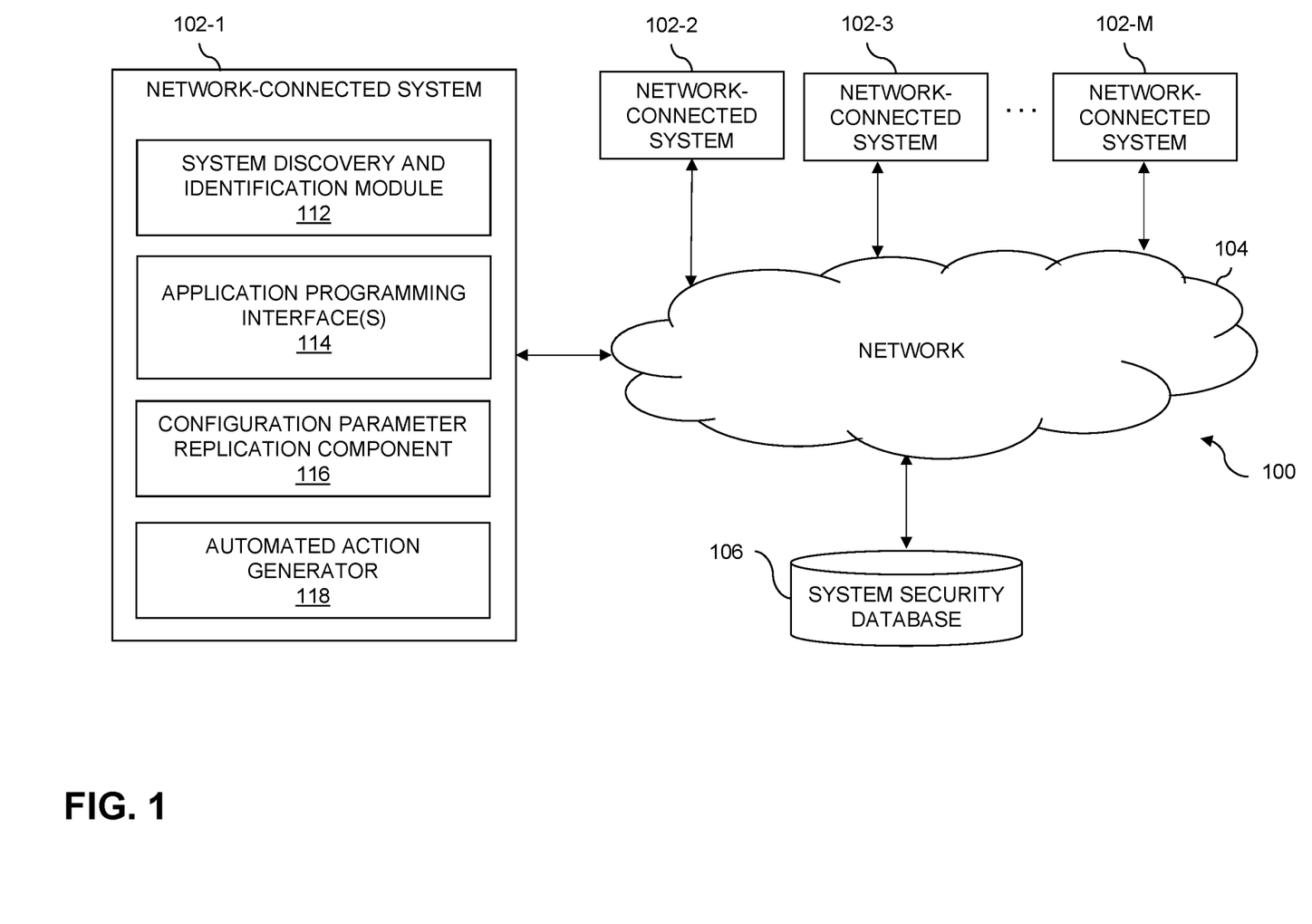
FIG. 1 shows an information processing system configured for automatically replicating configuration parameters from securely identified connected systems in an illustrative embodiment.

FIG. 1 shows a computer network (also referred to herein as an information processing system) 100 configured in accordance with an illustrative embodiment. The computer network 100 comprises a plurality of network-connected systems 102-1, 102-2, 102-3, . . . 102-M, collectively referred to herein as systems 102. The systems 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The systems 102 may comprise, for example, servers, cell towers and/or other types of edge servers, mobile telephones, laptop computers, tablet computers, desktop computers or other types of computing devices. Such devices are examples of what are more generally referred to herein as "processing devices." Some of these processing devices are also generally referred to herein as "computers."

The systems 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the systems 102 can have an associated system security database 106 configured to store data pertaining to connecting with other systems within the network, which comprise, for example, authentication data or other types of security-related data including passwords and other information associated with secure system connections.

The system security database 106 in the present embodiment is implemented using one or more storage systems associated with systems 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the systems 102 can be one or more input-output devices, which illustratively comprise keyboards, displays or other types of input-output devices in any combination. Such input-output devices can be used, for example, to support one or more user interfaces to systems 102, as well as to support communication between systems 102 and other related systems and devices not explicitly shown.

Each system 102 in the FIG. 1 embodiment is assumed to be implemented using at least one processing device. Each such processing device generally comprises at least one processor and an associated memory, and implements one or more functional modules for controlling certain features of the systems 102.

More particularly, systems 102 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the systems 102 to communicate over the network 104 with other systems 102, and illustratively comprises one or more conventional transceivers.

As also illustrated in FIG. 1, one or more of systems 102 in the FIG. 1 embodiment further comprise a system discovery and identification module 112, API(s) 114, configuration parameter replication component 116, and an automated action generator 118. It is to be appreciated that this particular arrangement of elements 112, 114, 116 and 118 illustrated in systems 102 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules or systems (such as systems 102, for example). As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically replicating configuration parameters from securely identified connected systems involving systems 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of at least one system 102 and system security database 106 can be on and/or part of the same processing platform.

An exemplary process utilizing elements 112, 114, 116 and 118 of an example system 102 in computer network 100 will be described in more detail with reference to the flow diagram of FIG. 4.

Accordingly, at least one embodiment includes automatically replicating configuration parameters from securely identified connected systems. For example, such an embodiment includes providing an automated solution to replicate at least a portion of the configuration parameters from one network-connected system to at least one other network-connected system using techniques for automated discovery of a source system (also referred to herein simply as "source") cluster manager so that the system/site administrator of a target system (also referred to herein simply as "target") cluster manager does not have to manually enter required parameters (which, in turn, for example, will render the initial configuration faster and more efficient). As used herein, a cluster manager refers to a graphical user interface (GUI) and/or command-line software that runs on one or more cluster nodes, one or more servers, etc.

As detailed herein, one or more embodiments include automatically discovering and securely identifying one or more available network-connected systems (also referred to herein as remote sites). Example techniques for automatically discovering and securely identifying one or more available network-connected systems are described in U.S. application Ser. No. 17/149,238, entitled "Automatically Discovering and Securely Identifying Connected Systems," filed on Jan. 14, 2021, and incorporated by reference herein. For instance, at least one embodiment includes automatically discovering available remote sites using domain name server (DNS) service discovery (DNS-SD) techniques, and using at least one handshake protocol based at least in part on an extension of digest access authentication. The term "DNS server," as used herein, is intended to be broadly construed, so as to encompass, for example, at least one server component of a Domain Name System, also commonly known by the acronym DNS.

Additionally, one or more embodiments include securing at least one cluster manager REST API for system-to-system (also referred to herein as site-to-site) communication. After automatically discovering and securely identifying one or more available network-connected systems, the source system cluster manager and the target system cluster manager are authenticated (e.g., using at least one handshake protocol). Accordingly, at this stage, one or more embodiments include performing multiple cluster manager modifications (e.g., using the same cluster manager code for the source cluster manager and/or the target cluster manager). For example, such an embodiment can include exposing a separate uniform resource identifier (URI) and/or namespace for a specific set of REST APIs for site-to-site communication. Additionally, such an embodiment can include implementing one or more security protocols for these REST APIs based at least in part on at least one handshake protocol (e.g., a handshake protocol established and/or used in automatically discovering and securely identifying one or more available network-connected systems). Further, such an embodiment can also include augmenting one or more user interface (UI) screens for configuration parameters to select at least one remote site input.

With respect to the above-noted REST APIs for site-to-site communication, in accordance with one or more embodiments, if the base uniform resource locator (URL) of a current REST API endpoint for a cluster manager looks, for example, like https://www.example.com/api/v1/, which requires regular OAuth 2.0 or basic authentication using a central identity-management system per site, then the new REST API for site-to-site communicate can be hosted at https://www.example.com/peer/api/v1, which would require a separate authentication (as further described herein). The "peer" namespace API, for example, may not be a new API but may simply be hosted at a different URI to distinguish and apply an authentication scheme separate from the regular namespace authentication scheme. Also, in one or more embodiments, the UI screens can make use of the regular namespace ("/api/v1"), and the remote site can make use of the peer namespace ("/peer/api/v1").

With respect to the above-noted REST API security for site-to-site communication, in accordance with one or more embodiments, the REST API hosted at peer namespace (https://www.example.com/peer/api/v1) starts with discovery and identification techniques (as described above). As part of automatically discovering and securely identifying one or more available network-connected systems, in at least one embodiment, the site administrator of the source cluster manager would have been prompted to enter the password of the target cluster manager. This password, along with a session key, can then be used to secure the REST API for site-to-site communication.

One or more embodiments also include carrying out session management actions. For example, in such an embodiment, the target cluster manager generates a session for a timed communication with the source system. The session key is returned to the source system as part of (e.g., at the end of) the phase of automatically discovering and securely identifying one or more available network-connected systems. Additionally, the session at the target cluster manager is configured to expire after x time of inactivity, after which the flow must restart from the phase of automatically discovering and securely identifying one or more available network-connected systems in order to create a new session. Also, in such an embodiment, the source cluster manager includes the session key with subsequent REST API calls (e.g., as a custom hypertext transfer protocol (HTTP) header such as "X-Y-Session"), and the target cluster manager validates that the session is still valid before processing the REST API call from the source cluster manager.

With respect to authentication actions and/or techniques, one or more embodiments can include the following. The source cluster manager creates a token T using a one-way hash as follows: HA1=HMAC(username:password); HA2=HMAC(X-Y-SystemID:sessionKey); HA3=HMAC(URL); and T=HMAC(HA1:HA2:HA3). The source cluster manager creates a digital signature S of the token T by encrypting the token T using the private key of the source system, such as follows: S=encryptUsingSourcePrivateKey(T). The source cluster manager then includes digital signature S in the REST API call, e.g., as the value of HTTP header "Authorization," and the target cluster manager validates the integrity of the HTTP "Authorization" header by decrypting the digital signature S using a public key of the source system, such as follows: T1=decryptUsingSourcePublicKey(S).

The target cluster manager then uses a hashing algorithm (e.g., a one-way hash such as used by the source cluster manager in creating token T) to create T2, such as illustrated in the following example:

sessionKey=Obtain session key from HTTP header "X-Y-Session";

X-Y-SystemID=Obtain source system identifier (ID) from HTTP header "X-Y-SystemID";

username=SessionMap[sessionKey].username;

password=LookupUserCredentialDatabase(username);

HA1=HMAC(username:password);

HA2=HMAC(X-Y-SystemID:sessionKey);

HA3=HMAC(URL); and

T2=HMAC(HA1:HA2:HA3).

Additionally, in such an embodiment, the target cluster manager compares T1 and T2, and returns an error message (e.g., 401 Unauthorized) if the values do not match; otherwise, the target cluster manager processes the REST API call. Further, in at least one embodiment, the X-Y-SystemID value may be used by the target cluster manager to whitelist allowed source cluster managers for the "peer" namespace.

Figure 2:
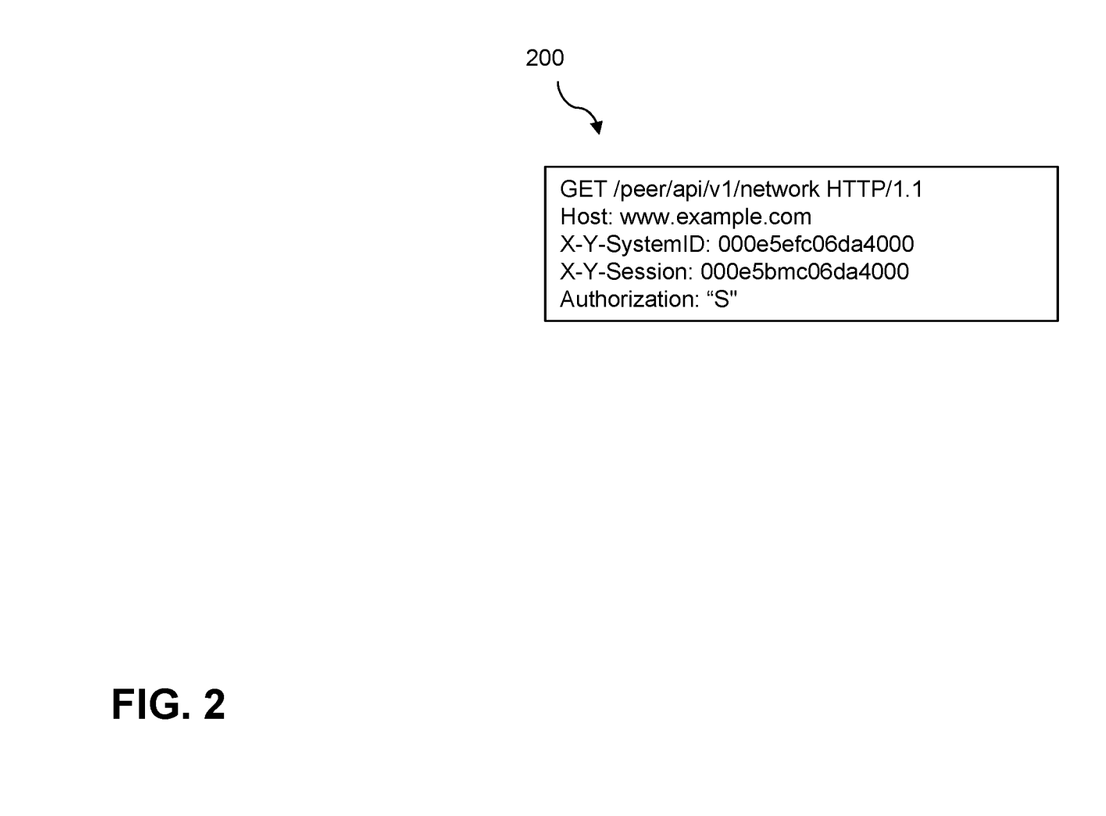
FIG. 2 shows an example code snippet for an example representational state transfer (REST) application programming interface (API) call from a source cluster manager in an illustrative embodiment.

FIG. 2 shows an example code snippet for an example REST API call from a source cluster manager in an illustrative embodiment. In this embodiment, example code snippet 200 is executed by or under the control of at least one processing system and/or device. For example, the example code snippet 200 may be viewed as comprising a portion of a software implementation of at least part of at least one network-connected system 102 of the FIG. 1 embodiment.

The example code snippet 200 includes an API call to obtain a list of network definitions from a source system to avoid or preclude the need for a system administrator to input these parameters manually. As further detailed herein, in at least one embodiment, the system administrator can be provided a subsequent opportunity, via a UI, to perform a bulk edit of any change required.

It is to be appreciated that this particular example code snippet shows just one example REST API call from a source cluster manager, and alternative implementations can be used in other embodiments.

Figure 3:
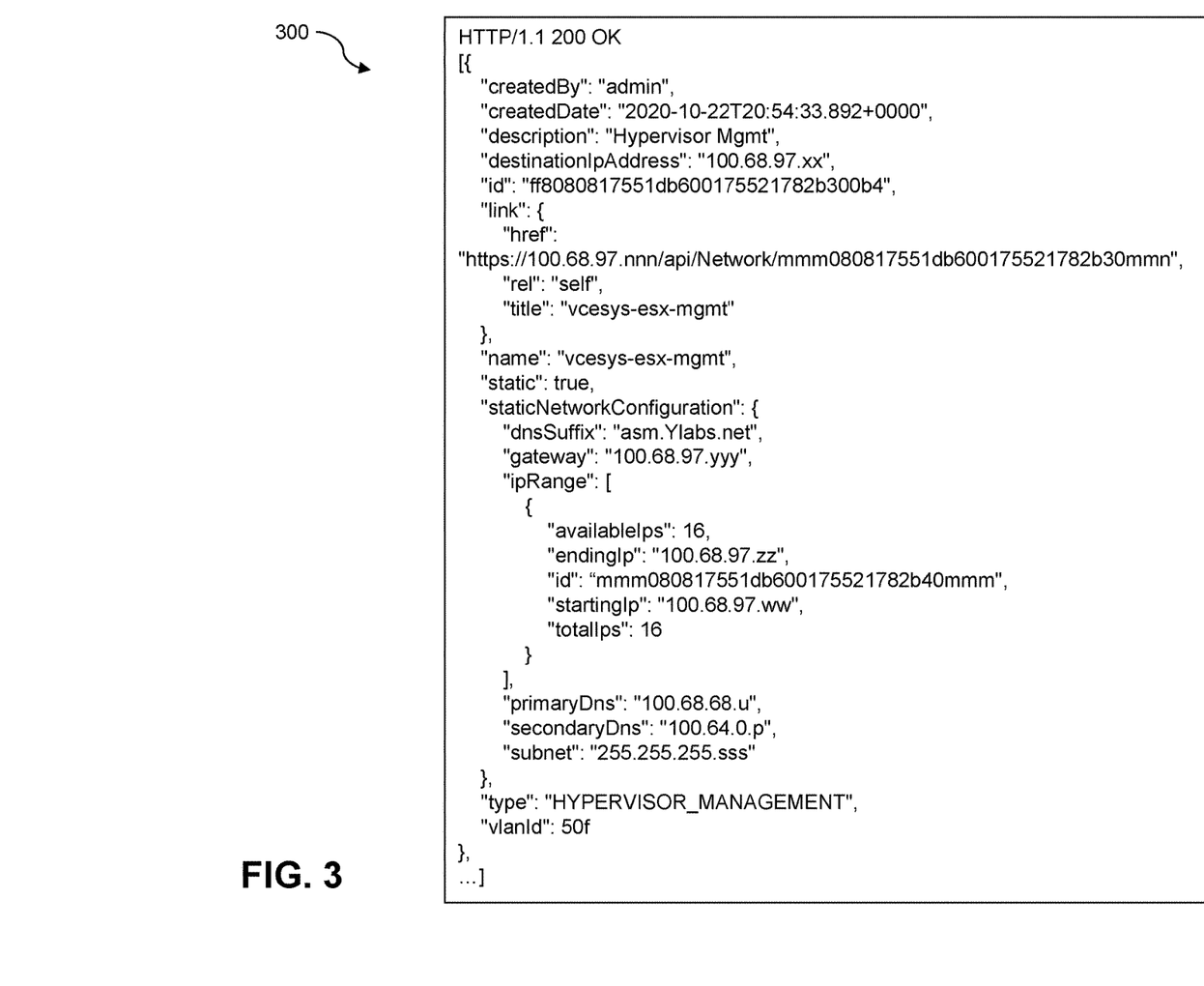
FIG. 3 shows an example successful response from a target cluster manager in an illustrative embodiment.

FIG. 3 shows an example successful response from a target cluster manager in an illustrative embodiment. In this embodiment, example code snippet 300 is executed by or under the control of at least one processing system and/or device. For example, the example code snippet 300 may be viewed as comprising a portion of a software implementation of at least part of at least one network-connected system 102 of the FIG. 1 embodiment.

The example code snippet 300 illustrates a response that includes a list of network definitions pertaining to, e.g., data networks, management networks, virtual machine (VM) networks, vMotion networks, etc. Such a network definition can include, for example, an IP range, gateway IP information, a subnet mask, DNS servers and/or domain names. In at least one embodiment, the network definition is used to configure the network interface of at least one device and/or server during a provisioning process.

It is to be appreciated that this particular example code snippet shows just one example successful response from a target cluster manager, and alternative implementations can be used in other embodiments. Other examples can include one or more of the following. For retrieving license information, a local (also referred to herein as source) cluster manager can query "GET/peer/api/v1/License" from a selected remote (also referred to herein as target) system. For retrieving credential information, a local cluster manager can query "GET/peer/api/v1/Credential" from a selected remote system, which will provide credential information of all resources types from the discovered system pre-filled without password information. In one or more embodiments, the user will be required to edit the password information of different resource groups after a cloning step. For resource control manager (RCM) information and download purposes, a local cluster manager can query "GET/peer/api/v1/FirmwareRepository" from a selected remote system, and this API can be enhanced, for example, to allow a source system to download RCM components from a discovered system.

Additionally, for retrieving network information, a local cluster manager can query "GET/peer/api/v1/Network" from a selected remote system. For retrieving resources information, a local cluster manager can query "GET/peer/api/v1/ManagedDevice" from a selected remote system. For retrieving template information, a local cluster manager can query "GET/peer/api/v1/ServiceTemplate" from a selected remote system, and in one or more embodiments, such a step can be optional for cloning activity. Further, for retrieving service detail information, a local Cluster Manager can query "GET/peer/api/v1/Deployment/<Deployment ID>" of a selected remote system.

As detailed herein, in accordance with one or more embodiments, one or more REST APIs are secured using a combination of asymmetric and symmetric keys, without requiring a central authentication system between peer sites. In such an embodiment, a short-lived session is maintained between peer systems to continue from an initial phase of automatically discovering and securely identifying one or more available network-connected systems. The session can include, for example, an inactivity timer that will force a user to restart the phase of automatically discovering and securely identifying one or more available network-connected systems after session expiration. Additionally, in such an embodiment, the user is prompted to provide a remote system password as part of a workflow for the phase of automatically discovering and securely identifying one or more available network-connected systems. Also, the valid session at the target system is renewed upon the next API call, and the digital signature validation at the target system confirms that the user was authenticated, the session is still valid, and the source system is one of the trusted systems. Further, in such an embodiment, the presence of X-Y-SystemID allows the target system to whitelist a list of known peer systems for the API call, and the presence of username in HA1 allows auditing of REST API calls at the target system.

One or more embodiments also include replicating or copying one or more configuration parameters and/or one or more settings from at least one remote site or system. Such an embodiment includes carrying out one or more changes to one or more UI screens of a cluster manager (i.e., the source cluster manager; also referred to herein as the local cluster manager). For example, such an embodiment can include implementing an option in a main menu for the discovery of available remote systems, wherein such a menu option can initiate a workflow for the phase of automatically discovering and securely identifying one or more available network-connected systems. Additionally, such an embodiment can include providing users, via the cluster manager, an option to replicate or copy one or more input parameters from one of the discovered remote systems. Further, at least one embodiment can include implementing one or more additional screens to perform bulk edits for network configuration (such as detailed above via various examples in connection with FIG. 3) to create one or more unique values based at least in part on a pattern from a given remote system.

In accordance with such an embodiment, a system administrator is automatically provided with the option, via the cluster manager, to enter input configuration parameters manually or to select at least one remote system, replicate at least a portion of the configuration parameters thereof, and (optionally) perform one or more edits to at least a portion of the replicated configuration parameters.

In one or more embodiments, when the replication method is selected, then the source cluster manager initiates at least one query using a "peer" namespace REST API of the remote cluster manager. For example, for retrieving license information, the local cluster manager (also referred to herein as the source cluster manager) can query GET/peer/api/v1/License from the selected remote system (also referred to herein as the target system). For retrieving credential information, the local cluster manager can query GET/peer/api/v1/Credential from the selected remote system, which will provide credential information of all resource types from the discovered system pre-filed without a password. The user will be required to edit the password(s) of the different resource groups after replication of one or more configuration parameters.

By way of further example, for RCM information and download purposes, the local cluster manager can query GET/peer/api/v1/FirmwareRepository from the selected remote system, and such an API can be enhanced to allow the source system to download one or more RCM components from the discovered system. For retrieving network information, the local cluster manager can query GET/peer/api/v1/Network from the selected remote system, and for retrieving resources information, the local cluster manager can query GET/peer/api/v1/ManagedDevice from the selected remote system.

Additionally, for example, for retrieving template information, the local cluster manager can query GET/peer/api/v1/ServiceTemplate from the selected remote system (wherein this step, e.g., could be optional for replication activity). Further, for retrieving service detail information, the local cluster manager can query GET/peer/api/v1/Deployment/<Deployment ID> from the selected remote system.

In at least one embodiment, the local cluster manager will encompass capabilities to perform one or more of the above-noted queries in connection with any and/or all of the discovered remote systems. In such an embodiment, a local cluster manager UI and/or controller layer aggregates the collected information and displays at least a portion of the collected information in the UI for one or more users. Information from multiple systems can be displayed, for example, via a sub-menu design pattern such that a user can select a replication task for networks, resources, RCM and service template, etc. using portions of data from one or more of the different discovered systems. Users will also be automatically provided with an option to delete one or more portions of replicated configuration data, for example, if not required for a particular deployment. Upon completion of such noted pre-deployment steps, the local cluster manager will prompt the user to proceed with the given service deployment.

Accordingly, one or more embodiments provide improvements to deployment timing, for example, in contexts including building identical converged and hyperconverged solutions for multiple data center sites using a cluster manager. Additionally, such an embodiment includes providing read-only support of one or more remote sites for efficient management and increased visibility using a single instance of a cluster manager, e.g., for converged and hyperconverged environments. For example, such an embodiment can limit and/or preclude unnecessary repetition of processes and configuration efforts when deploying sites sharing a given level of similarity. Such an embodiment also provides the ability to achieve multi-site consistency for configurations and deployments when using separate cluster manager instances across the multiple sites, which can further facilitate and/or improve ease of infrastructure management for IT administrators due to environment consistency.

Figure 4:
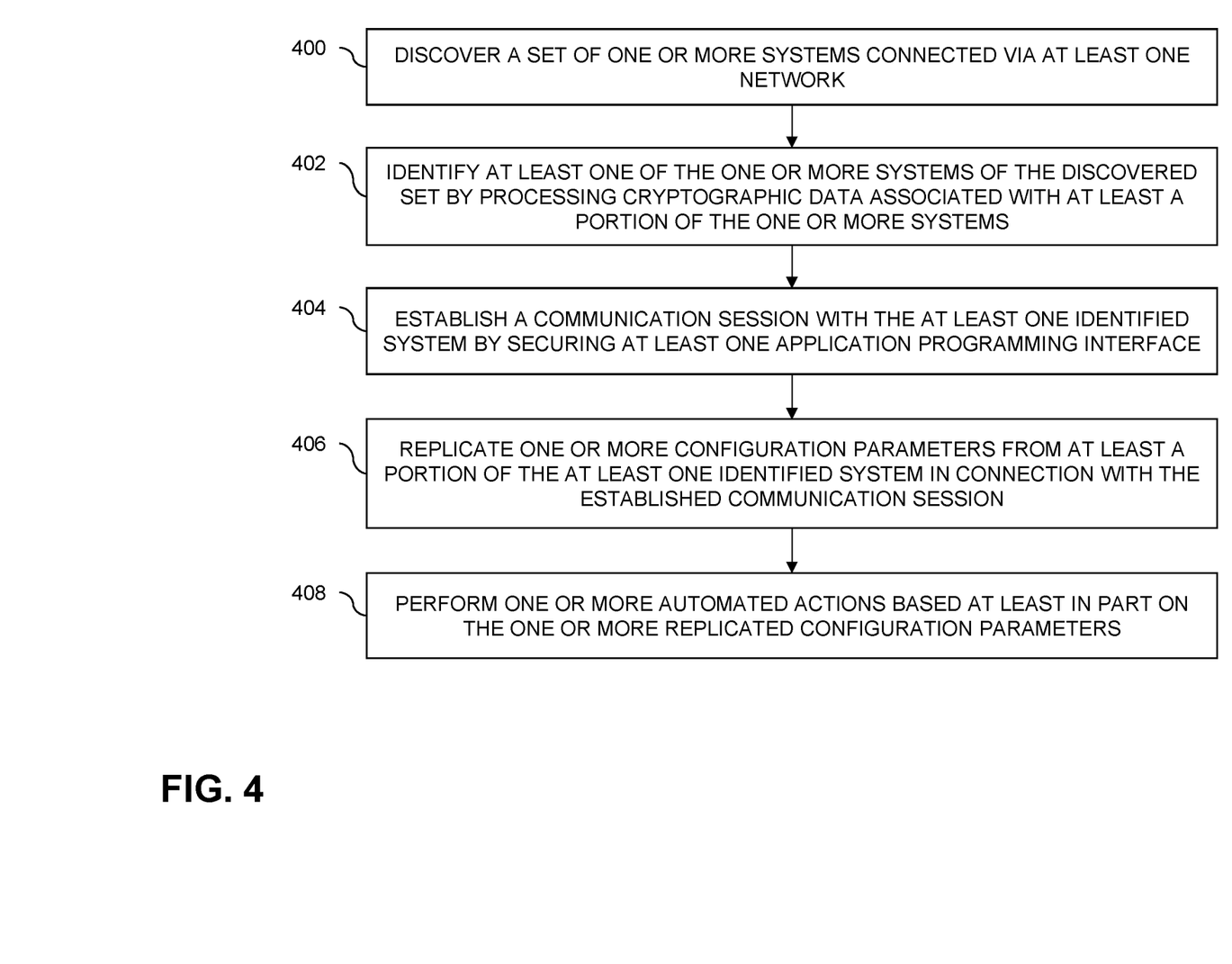
FIG. 4 is a flow diagram of a process for automatically replicating configuration parameters from securely identified connected systems in an illustrative embodiment.

FIG. 4 is a flow diagram of a process for automatically replicating configuration parameters from securely identified connected systems in an illustrative embodiment. It is to be understood that this particular process is only an example, and additional or alternative processes can be carried out in other embodiments.

In this embodiment, the process includes steps 400 through 408. These steps, in one or more embodiments, can be performed by at least one system 102 utilizing elements 112, 114, 116 and 118.

Step 400 includes discovering a set of one or more systems connected via at least one network (e.g., using one or more domain name server (DNS) service discovery techniques). In at least one embodiment, the one or more systems connected via at least one network include one or more systems connected using one or more respective site-specific central identity and authentication systems. Step 402 includes identifying at least one of the one or more systems of the discovered set by processing cryptographic data associated with at least a portion of the one or more systems (e.g., using one or more digest access authentication techniques).

Step 404 includes establishing a communication session with the at least one identified system by securing at least one API. In at least one embodiment, the at least one API includes at least one REST API associated with at least one cluster manager. In one or more embodiments, securing at least one API includes exposing at least one of a separate uniform resource indicator and a separate namespace for a specified set of one or more APIs designated for system-to-system communication. Additionally or alternatively, securing at least one application programming interface can include using a combination of one or more asymmetric keys and one or more symmetric keys.

Also, in at least one embodiment, establishing the communication session further includes enabling user selection of at least a portion of the at least one identified system for configuration parameter replication by modifying one or more user interfaces. Additionally or alternatively, establishing the communication session can further include implementing an inactivity timer, wherein the communication session is automatically ended upon expiration of the inactivity time.

Step 406 includes replicating one or more configuration parameters from at least a portion of the at least one identified system in connection with the established communication session. In at least one embodiment, replicating one or more configuration parameters includes replicating the one or more configuration parameters in response to a user selection of at least a portion of the at least one identified system. Also, in at least one embodiment, the one or more configuration parameters include configuration parameters related to one or more of one or more networks, one or more resources, resource control manager information and one or more service templates.

Step 408 includes performing one or more automated actions based at least in part on the one or more replicated configuration parameters. In one or more embodiments, performing one or more automated actions includes implementing at least a portion of the one or more replicated configuration parameters in a deployment of at least one system and/or performing one or more edits to at least a portion of the one or more replicated configuration parameters.

In at least one embodiment, the techniques depicted in FIG. 4 are performed by at least one source system from the set of one or more systems (e.g., by at least one cluster manager associated with the at least one source system), wherein the at least one identified system comprises at least one target system from the set of one or more systems.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically replicate configuration parameters from securely identified connected systems. These and other embodiments can effectively overcome problems associated with time-consuming and error-prone manual efforts for defining network configuration parameters.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
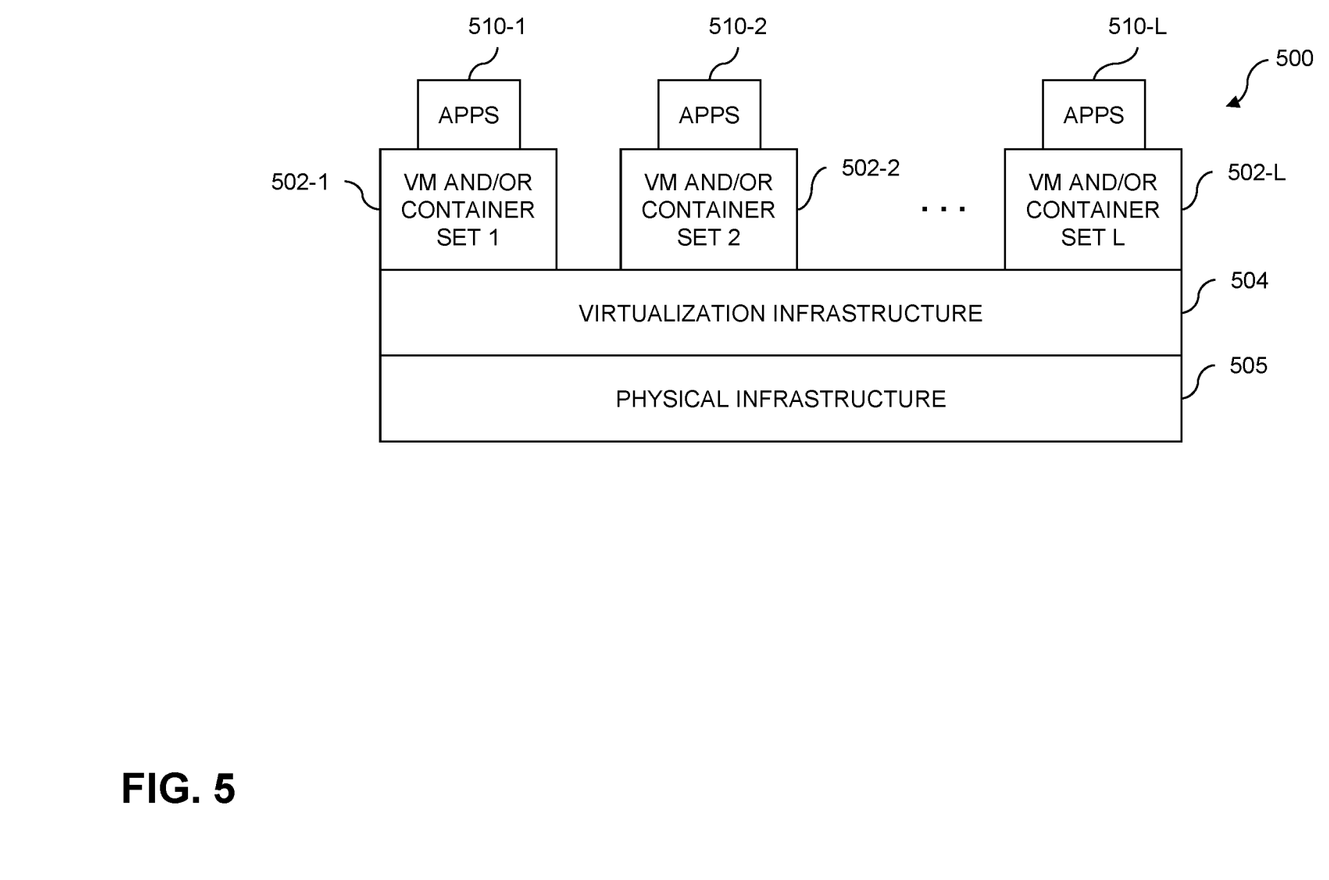
FIGS. 5 and 6 show examples of processing platforms that may be utilized to implement at least a portion of an information processing system in illustrative embodiments.
Figure 6:
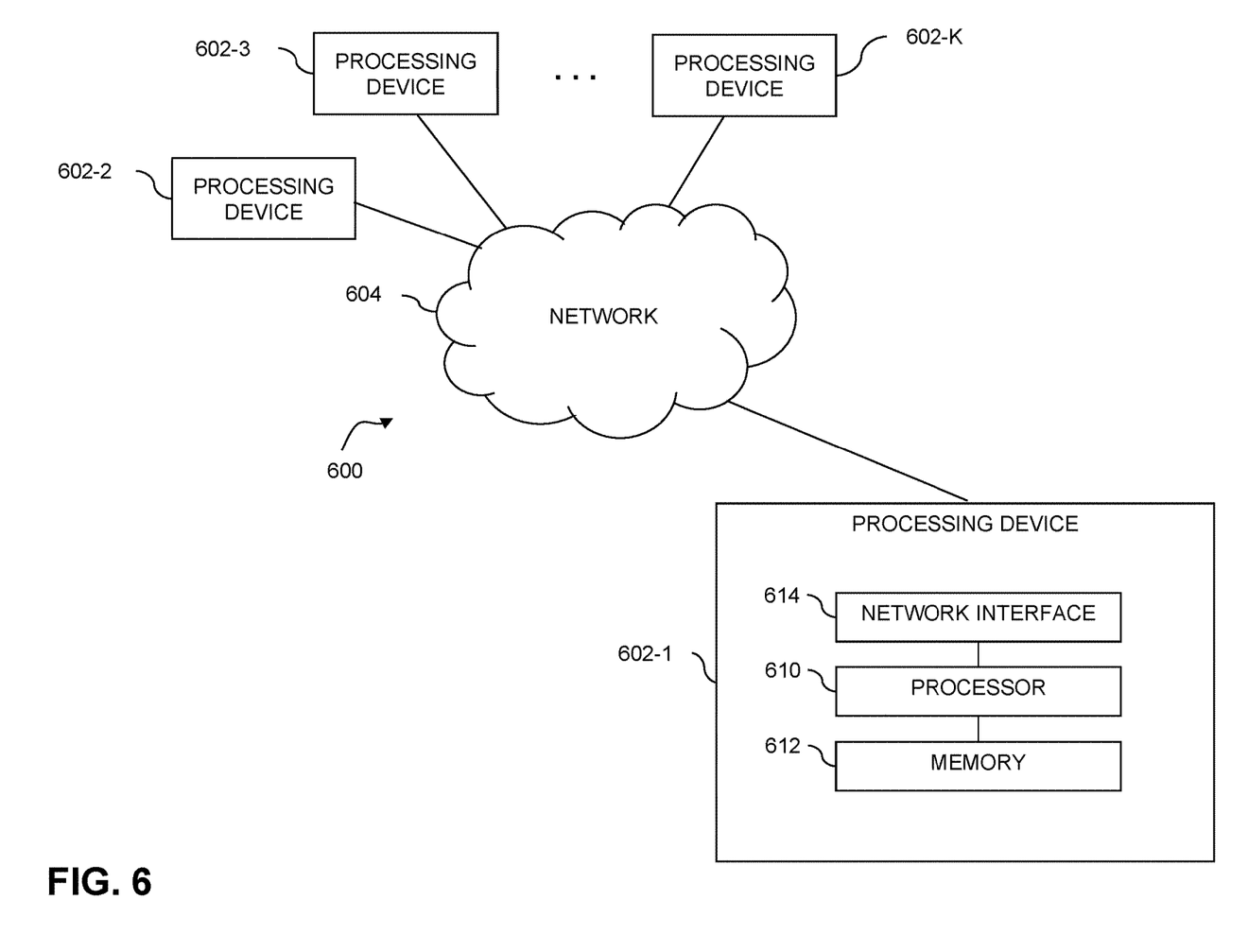

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple VMs and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
discovering a set of one or more systems connected via at least one network;
identifying at least one of the one or more systems of the discovered set by processing cryptographic data associated with at least a portion of the one or more systems;
establishing a communication session with the at least one identified system by securing one or more application programming interfaces, wherein securing one or more application programming interfaces comprises exposing at least one of (i) a separate uniform resource indicator and (ii) a separate namespace, for at least one of the one or more application programming interfaces that is designated for system-to-system communication, and wherein establishing the communication session comprises implementing an inactivity timer wherein the communication session is automatically ended upon expiration of the inactivity timer;
replicating, based at least in part on a user selection of at least a portion of the at least one identified system, one or more configuration parameters from the at least a portion of the at least one identified system in connection with the established communication session; and
performing one or more automated actions based at least in part on the one or more replicated configuration parameters;
wherein the method is performed by at least one processing device comprising a processor coupled to a memory.

2. The computer-implemented method of claim 1, wherein the one or more application programming interfaces comprises at least one representational application programming interface associated with at least one cluster manager.

3. The computer-implemented method of claim 1, wherein securing one or more application programming interfaces comprises using a combination of one or more asymmetric keys and one or more symmetric keys.

4. The computer-implemented method of claim 1, wherein performing one or more automated actions comprises performing one or more edits to at least a portion of the one or more replicated configuration parameters.

5. The computer-implemented method of claim 1, wherein performing one or more automated actions comprises implementing at least a portion of the one or more replicated configuration parameters in a deployment of at least one system.

6. The computer-implemented method of claim 1, wherein establishing the communication session further comprises enabling user selection of at least a portion of the at least one identified system for configuration parameter replication by modifying one or more user interfaces.

7. The computer-implemented method of claim 1, wherein the one or more configuration parameters comprise configuration parameters related to one or more of one or more networks, one or more resources, resource control manager information and one or more service templates.

8. The computer-implemented method of claim 1, wherein the method is performed by at least one source system from the set of one or more systems, and wherein the at least one identified system comprises at least one target system from the set of one or more systems.

9. The computer-implemented method of claim 8, wherein the method is performed by at least one cluster manager associated with the at least one source system.

10. The computer-implemented method of claim 1, wherein the one or more systems connected via at least one network comprise one or more systems connected using one or more respective site-specific central identity and authentication systems.

11. A non-transitory processor-readable storage medium having stored therein program code of one or more software programs, wherein the program code when executed by at least one processing device causes the at least one processing device:
   to discover a set of one or more systems connected via at least one network;
   to identify at least one of the one or more systems of the discovered set by processing cryptographic data associated with at least a portion of the one or more systems;
   to establish a communication session with the at least one identified system by securing one or more application programming interfaces, wherein securing one or more application programming interfaces comprises exposing at least one of (i) a separate uniform resource indicator and (ii) a separate namespace, for at least one of the one or more application programming interfaces that is designated for system-to-system communication, and wherein establishing the communication session comprises implementing an inactivity timer wherein the communication session is automatically ended upon expiration of the inactivity timer;
   to replicate, based at least in part on a user selection of at least a portion of the at least one identified system, one or more configuration parameters from the at least a portion of the at least one identified system in connection with the established communication session; and
   to perform one or more automated actions based at least in part on the one or more replicated configuration parameters.

12. The non-transitory processor-readable storage medium of claim 11, wherein the one or more application programming interfaces comprises at least one representational application programming interface associated with at least one cluster manager.

13. The non-transitory processor-readable storage medium of claim 11, wherein performing one or more automated actions comprises performing one or more edits to at least a portion of the one or more replicated configuration parameters.

14. An apparatus comprising:
   at least one processing device comprising a processor coupled to a memory;
   the at least one processing device being configured:
      to discover a set of one or more systems connected via at least one network;
      to identify at least one of the one or more systems of the discovered set by processing cryptographic data associated with at least a portion of the one or more systems;
      to establish a communication session with the at least one identified system by securing one or more application programming interfaces, wherein securing one or more application programming interfaces comprises exposing at least one of (i) a separate uniform resource indicator and (ii) a separate namespace, for at least one of the one or more application programming interfaces that is designated for system-to-system communication, and wherein establishing the communication session comprises implementing an inactivity timer wherein the communication session is automatically ended upon expiration of the inactivity timer;
      to replicate, based at least in part on a user selection of at least a portion of the at least one identified system, one or more configuration parameters from the at least a portion of the at least one identified system in connection with the established communication session; and
      to perform one or more automated actions based at least in part on the one or more replicated configuration parameters.

15. The apparatus of claim 14, wherein the one or more application programming interfaces comprises at least one representational application programming interface associated with at least one cluster manager.

16. The apparatus of claim 14, wherein securing one or more application programming interfaces comprises using a combination of one or more asymmetric keys and one or more symmetric keys.

17. The apparatus of claim 14, wherein performing one or more automated actions comprises implementing at least a portion of the one or more replicated configuration parameters in a deployment of at least one system.

18. The apparatus of claim 14, wherein performing one or more automated actions comprises performing one or more edits to at least a portion of the one or more replicated configuration parameters.

19. The apparatus of claim 14, wherein establishing the communication session further comprises enabling user selection of at least a portion of the at least one identified system for configuration parameter replication by modifying one or more user interfaces.

20. The non-transitory processor-readable storage medium of claim 11, wherein establishing the communication session further comprises enabling user selection of at least a portion of the at least one identified system for configuration parameter replication by modifying one or more user interfaces.

* * * * *